A. L. J. QUENEAU.
CONDENSATION OF ZINC.
APPLICATION FILED APR. 23, 1912.

1,082,765.

Patented Dec. 30, 1913.

Witnesses.

Inventor:
A. L. J. Queneau,
Attorneys.

ately in opposite directions, so as to subject the contents of the chamber to a tumbling action. As fully set forth in my patent referred to, it is provided with a molten resistor D, of molten metal, or of molten slag, adapted to be maintained in a condition of high fluidity, during the operation of the furnace, by the passage of an electric current of suitable amperage, so as to supply the necessary heat for reducing the zinc ore of the charge of zinc ore and coke resting upon the molten resistor. I need not further describe the construction and mode of operation of the reducing chamber, inasmuch as the same is fully set forth in my Letters Patent referred to.
UNITED STATES PATENT OFFICE.

AUGUSTIN L. J. QUENEAU, OF PHILADELPHIA, PENNSYLVANIA.

CONDENSATION OF ZINC.

1,082,765.  Specification of Letters Patent.  Patented Dec. 30, 1913.

Application filed April 23, 1912. Serial No. 692,655.

*To all whom it may concern:*

Be it known that I, AUGUSTIN L. J. QUENEAU, a citizen of the Republic of France, residing at Philadelphia, county of Philadelphia, State of Pennsylvania, have invented certain new and useful Improvements in Condensation of Zinc; and I do hereby declare the following to be a full, clear, and exact description of the invention, such as will enable others skilled in the art to which it appertains to make and use the same.

My invention relates to certain new and useful improvements in the condensation of zinc vapors from a mixture of vapors and gases given off in the reduction of zinc from zinc ores and other zinciferous compounds.

For purposes of illustration, I have shown the condenser employed in carrying out the invention, as applied to a rotary electric furnace for the reduction of zinc ores and zinciferous compounds, of the type described and claimed in Letters Patent of the United States No. 1,006,877, granted to me under date of October 24th, 1911. As will hereinafter more fully appear, I prefer to thus connect the condenser to a rotary electric zinc furnace, or to otherwise impart rotation to the condenser, in order to utilize its capabilities to the greatest extent and to insure the more equal and uniform duration of its parts. But I do not limit myself to imparting to the condenser a continuous rotary motion, an intermittently rotating motion, or an alternating rotary motion, as contemplated in said patent, inasmuch as many of its characteristic functions would be fulfilled if the structure were entirely stationary, which is likewise within the purpose and contemplation of my invention.

Figure 1:
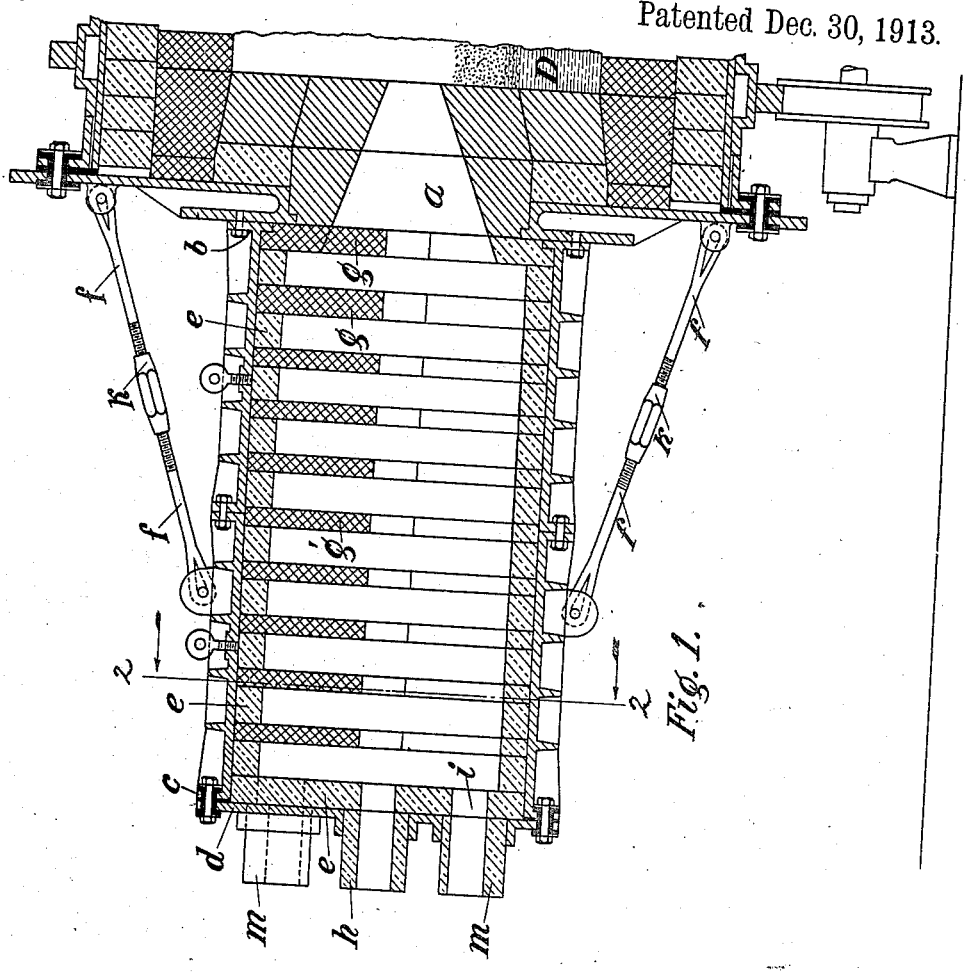
Figure 2:
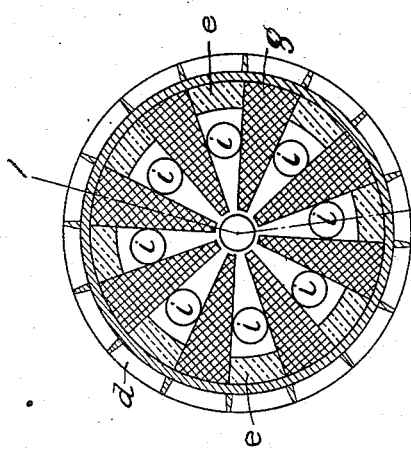
Figure 3:
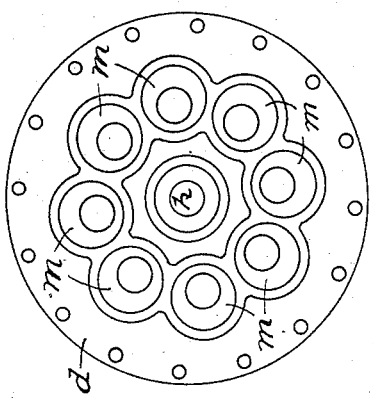

In the accompanying drawing: Figure 1, represents a longitudinal section, on the line 1—1 of Fig. 2, of a condenser constructed in accordance with my invention and shown as connected up for rotation with a rotary electric zinc reduction furnace of the type shown in my United States Patent No. 1,006,877; Fig. 2, represents a cross-sectional view thereof on the line 2—2 of Fig. 1; Fig. 3, represents an end view of the condenser.

Similar letters of reference indicate similar parts throughout the several views.

The reducing chamber, a portion of which is shown in section in Fig. 1, is of the rotary type, that is, it is a chamber adapted to be rotated continuously or intermittently in one direction, or alternately in opposite directions, so as to subject the contents of the chamber to a tumbling action. As fully set forth in my patent referred to, it is provided with a molten resistor D, of molten metal, or of molten slag, adapted to be maintained in a condition of high fluidity, during the operation of the furnace, by the passage of an electric current of suitable amperage, so as to supply the necessary heat for reducing the zinc ore of the charge of zinc ore and coke resting upon the molten resistor. I need not further describe the construction and mode of operation of the reducing chamber, inasmuch as the same is fully set forth in my Letters Patent referred to.

The condenser, when employed in connection with a furnace of the rotary type, may conveniently be removably attached to one of the end plates thereof, as for instance, by means of the screw-threaded rods *f*, provided with turn-buckles *k* for adjusting their tension. The condenser is provided with an outer metallic shell, which may be made up of sections bolted together, as shown, and these sections are preferably provided with outer ribs, longitudinal and transverse, for the purpose of assisting in the radiation of heat from the shell. The flange *b* is adapted to be bolted to the end plate of the rotary reduction chamber or furnace, and the flange *c* is bolted to the end-plate *d* of the condenser, the end-plate *d* being preferably insulated from the condenser shell, by the interposition of suitable insulating material, as shown.

The shell of the condenser is provided with a lining *e* of refractory material, such as fire-brick. It is likewise provided with a series of radially arranged carbonaceous baffles, projecting inwardly from the shell and spaced apart at suitable intervals. The function of these baffles is, in part, to conduct the excess of heat from the interior space of the condenser to the metallic shell, from which it is then radiated; in part, to serve as condensing surfaces to initiate the condensation of the zinc vapors in the form of small drops or globules serving as the nuclei for further condensation; in part to equalize the temperature conditions at corresponding zones of the condenser's interior; and, in part, to unite with any carbon dioxid which may be present in the gases coming over from the zinc reduction furnace and to convert them as far as possible into carbon monoxid, thereby reducing the possibility of oxidation of the zinc vapors within the condenser.

Inasmuch as the zone of the condenser immediately proximate to the flaring discharge aperture a of the furnace is the region of highest temperature, I prefer to make the first two radial courses g of baffles, of a quality of carbon less susceptible to corrosion by the furnace gases than the carbon employed for the courses of baffles beyond. To this end, I prefer for the baffles g of these first two courses graphite of high quality such, for instance, as Acheson graphite, which is likewise preferable because of its very high conductivity for heat, so that, while it plays its part in the conversion of any carbon dioxid present, it is not unduly consumed in such conversion, and at the same time is especially efficient in abstracting heat within the zone of its greatest intensity.

The remaining courses of baffles may, of course, likewise be made of Acheson graphite or other graphite of high quality, but, for all usual purposes, it will suffice to make them of less expensive or lower grade carbon, as, for instance, from ungraphitized amorphous carbon, and, as shown, they may likewise be made of lesser thickness in view of the circumstance that they are not subjected to the more exacting conditions imposed upon the first course of the series.

The end-plate d of the condenser is provided with a central aperture h, in line with the longitudinal central axis of the condenser and in line with the discharge aperture of the furnace chamber, so that the operator is afforded every opportunity for the insertion of a clearing iron through this aperture in order to remove any obstructions that might possibly form in the flaring aperture a. So also, at the point opposite the intervals between the individual members of the several courses of baffle plates, similar openings are provided in the end-plate of the condenser, whereby the condenser itself may be effectively accessible to prevent possible accretions therein.

The refractory lining of the end-plate is itself provided with a series of apertures i corresponding to the outer series of apertures of the end-plate, and the apertures i are located in such relationship to the interior space of the condenser that when they successively reach the lowermost position during the revolution of the condenser they can serve as draining openings through which the condensed zinc may be continuously discharged. Whether this discharge is such as to keep the condenser practically clear of any collecting pool at its bottom, or whether such a collecting pool is to be constantly maintained, depends upon the adjustment of a series of axially adjustable hollow discharge plugs m, with which the circular series of apertures of the end-plate are provided. These discharge plugs are bored eccentrically, as shown, so that by suitably turning them in the end-plate, they may be given an adjustment which will give free outlet to the liquefied zinc through the aperture i, or so that they will dam back a certain amount of the liquefied zinc to form the depth of pool desired within the condenser. In either case, that is to say, whether the adjustment chosen for the hollow discharge plugs m shall be such as to maintain a pool within the condenser or not, I contemplate maintaining a continuous discharge from the condenser, so that, having once established the effective area of the condenser for any particular conditions of use, that factor may remain constant, rather than to be changed by a progressive raising of the level of the liquefied zinc within the condensing chamber. It will, of course, be understood that if a pool of greater or less depth is established within the condenser by a corresponding adjustment of the eccentric plugs m, the several baffles, as the condenser rotates, will dip into this pool and tend to carry a portion of the molten zinc up into the free space of the condenser, which will tend to give to the condensing operation such advantage as is incident to the exposure of the zinc thus raised to the condensing zinc vapor. If the condenser is to be rotated, it will usually be preferable to give it a relatively low rate of rotation, say from 6 to 18 revolutions per hour.

For the most efficient use of the condenser, it is desirable that the temperature conditions therein should be so established, for any particular use, that the condensation and liquefaction point should be realized throughout a substantial portion of the structure, the extent to which this can be realized determining the capacity of the apparatus for completeness of recovery of the zinc vapors present. To this end, the heat conducting capacity of the baffles, the heat dispersing capacity of the shell, the dimensions of the condenser, the quality and character of the refractory lining, and the other variable factors must be carefully adjusted with reference to the amount, character and temperature of the mixture of gases and vapors received from the reduction furnace, so that the conditions prevailing within the condenser shall correspond as closely as possible to the maximum condensation.

Having thus described my invention what I claim is:—

1. A condenser for zinc vapors, provided with baffle plates of carbon projecting into its interior; substantially as described.

2. A condenser for zinc vapors, provided with baffle plates of carbon projecting into its interior, said baffle plates being spaced apart longitudinally of the condenser; substantially as described.

3. A condenser for zinc vapors, provided with baffle plates of carbon projecting into its interior, said baffle plates being spaced apart longitudinally of the condenser and being likewise spaced apart transversely of the condenser; substantially as described.

4. A condenser for zinc vapors, provided with baffle plates of carbon projecting into its interior, said baffle plates being spaced apart longitudinally of the condenser and being likewise spaced apart transversely of the condenser, the transverse spacings being in alinement from end to end of the condenser, and the condenser being provided with an end-plate having openings corresponding to the alined transverse spacings; substantially as described.

5. A condenser for zinc vapors, provided with a series of courses of baffle plates of carbon, the plates of the several courses projecting radially inward and being separated from each other by intervening spaces; substantially as described.

6. A condenser for zinc vapors, provided with baffle plates of graphite in the zone of the condenser proximate to the inlet for the condensable vapors; substantially as described.

7. A condenser for zinc vapors, provided with baffle plates of carbon and having a metallic shell in heat-conducting connection with the baffle plates; substantially as described.

8. A condenser for zinc vapors, provided with baffle plates of carbon, in combination with means for rotating the condenser; substantially as described.

9. A condenser for zinc vapors, provided with a continuous discharge for the liquefied zinc and means for establishing a pool of variable depth of liquefied zinc within the condenser; substantially as described.

10. A condenser for zinc vapors, provided with a continuous discharge for the liquefied zinc and means for establishing a pool of variable depth of liquefied zinc within the condenser, said means consisting of an eccentrically bored discharge plug; substantially as described.

11. A condenser for zinc vapors, provided with a series of courses of baffle plates, and a metallic shell in heat-conducting connection therewith, said condenser having an inlet for the zinc vapors and the accompanying gases, the baffle plates proximate to the inlet of the condenser being of greater heat-conducting capacity than those beyond; substantially as described.

12. A condenser for zinc vapors, provided with a series of courses of baffle plates, and a metallic shell in heat-conducting connection therewith, said condenser having an inlet for the zinc vapors and the accompanying gases, the baffle plates proximate to the inlet of the condenser being of greater heat-conducting capacity than those beyond, and the baffle plates throughout the series being of carbon; substantially as described.

13. A condenser for zinc vapors, having a metallic shell and provided with an internal lining, whose structure is in part constituted of carbon plates; substantially as described.

14. A condenser for zinc vapors, provided with a metallic shell and having a lining of refractory fire-bricks within which are set plates of carbon; substantially as described.

In testimony whereof I affix my signature in presence of two witnesses.

AUGUSTIN L. J. QUENEAU.

Witnesses:
M. A. BILL,
FRANK A. HENNESSY.